United States Patent [19]
Holley et al.

[11] Patent Number: 5,015,934
[45] Date of Patent: May 14, 1991

[54] APPARATUS AND METHOD FOR MINIMIZING LIMIT CYCLE USING COMPLEMENTARY FILTERING TECHNIQUES

[75] Inventors: Steven R. Holley, Phoenix; David C. Cunningham, Carefree, both of Ariz.; Kevin D. Kral, Streamwood, Ill.

[73] Assignee: Honeywell Inc., Minneapolis, Minn.

[21] Appl. No.: 415,803

[22] Filed: Sep. 25, 1989

[51] Int. Cl.$^5$ .............................................. G05B 5/01
[52] U.S. Cl. .................................... 318/611; 318/585; 318/584; 364/413.01; 250/201
[58] Field of Search ...................... 318/611, 585, 584; 364/414; 250/201

[56] References Cited

U.S. PATENT DOCUMENTS

| | | | |
|---|---|---|---|
| 4,148,452 | 4/1979 | Niessen et al. | 318/585 |
| 4,463,375 | 7/1984 | Macovski | 364/414 X |
| 4,667,090 | 5/1987 | Carreras et al. | 250/201 |
| 4,697,768 | 10/1987 | Klein | 318/584 |

Primary Examiner—William M. Shoop, Jr.
Assistant Examiner—Saul M. Bergmann
Attorney, Agent, or Firm—A. A. Sapelli; D. J. Lenkszus; A. Medved

[57] ABSTRACT

The apparatus controls the positioning of a device in response to a commanded input signal, and comprises an element for moving the device in response to an error signal. A sensor component determines the actual position of the device, the sensor component outputting a primary signal and a derivative signal corresponding to the actual position and velocity of the device, respectively. A complementary filter system filters the primary signal and the derivative signal to generate a derived position signal, the derived position signal being combined with the commanded input signal thereby generating the error signal. The filtering results in effectively increasing the resolution of the sensor component thereby reducing the limit cycle caused by quantization of the sensor component.

12 Claims, 4 Drawing Sheets

NOTE 1: S DOMAIN EQUIVALENT IS $\frac{1}{\tau s+1}$

NOTE 2: S DOMAIN EQUIVALENT IS $\frac{\tau}{\tau s+1}$

APPARATUS AND METHOD FOR MINIMIZING LIMIT CYCLE USING COMPLEMENTARY FILTERING TECHNIQUES

BACKGROUND OF THE INVENTION

This invention was made with U.S. Government support and the U.S. Government has certain rights therein This invention relates to servo-controlled positioning systems, and more particularly, to an apparatus and method for minimizing the quantization limit cycle effects in servo-controlled positioning systems which employ quantizing analog-to-digital elements in the feedback path.

Hybrid control systems which contain both analog and digital elements are prone to exhibiting inherent limit cycles due to the effects of digital quantization. These limit cycles can impact system performance particularly in pointing and positioning systems resulting in unwanted pointing jitter and reaction torques. The effects of limit cycles caused by quantization are reduced by increasing resolution or using smaller quantization steps. In existing, present day pointing and positioning control systems, increasing resolution or using smaller quantization steps has been achieved by utilizing higher resolution position sensing devices. However, higher resolution devices are costlier and more complex to implement and are generally unwarranted by the system requirements in terms of static positioning accuracy.

The present invention increases the effective resolution of the quantized digital feedback element without the need for utilizing higher resolution elements. The effective resolution of the system of the present invention is increased by including derivative feedback through a complementary filter. In systems which include a resolver-to-digital converter as the positioning feedback element, the present invention can be implemented without adding additional sensors, since the derivative feedback signal is generally provided by the tracking resolver-to-digital converter. (For a digital positioning feedback element, the derivative feedback signal is a velocity signal.) As a result costlier, more complex devices are not needed to minimize limit cycle effects due to quantization. The present invention permits the use of lower cost, less complex devices to minimize quantization limit cycle effects.

SUMMARY OF THE INVENTION

Therefore, there is provided by the present invention, an apparatus for effectively increasing resolution of the converter thereby minimizing effects due to limit cycles. The apparatus controls the positioning of a device in response to a commanded input signal, and comprises an element for moving the device in response to an error signal. A sensor component determines the actual position of the device, the sensor component outputting a primary signal and a derivative signal corresponding to the actual position and velocity of the device, respectively. The primary signal and the derivative signal are combined in a complementary filter system to generate a derived position signal, the derived position signal being combined with the commanded input signal thereby generating the error signal. The filtering results in effectively increasing the resolution of the sensor component thereby reducing the limit cycle caused by quantization of the sensor component.

Accordingly, it is an object of the present invention to provide an apparatus for effectively increasing resolution.

It is another object of the present invention to provide an apparatus for effectively increasing resolution of a quantized digital position signal.

It is still another object of the present invention to provide an apparatus for effectively increasing resolution of a quantized digital position signal in servo-controlled positioning systems.

It is yet another object of the present invention to provide an apparatus for minimizing quantization limit cycle effects.

It is a further object of the present invention to provide an apparatus for minimizing quantization limit cycle effects in servo-controlled positioning systems.

It is still a further object of the present invention to provide an apparatus for minimizing quantization limit cycle effects in servo-controlled positioning systems which employ quantizing analog-to-digital elements in the feedback path.

These and other objects of the present invention will become more apparent when taken in conjunction with the following description and attached drawings, wherein like characters indicate like parts, and which drawings form a part of the present application.

DETAILED DESCRIPTION

Figure 1:
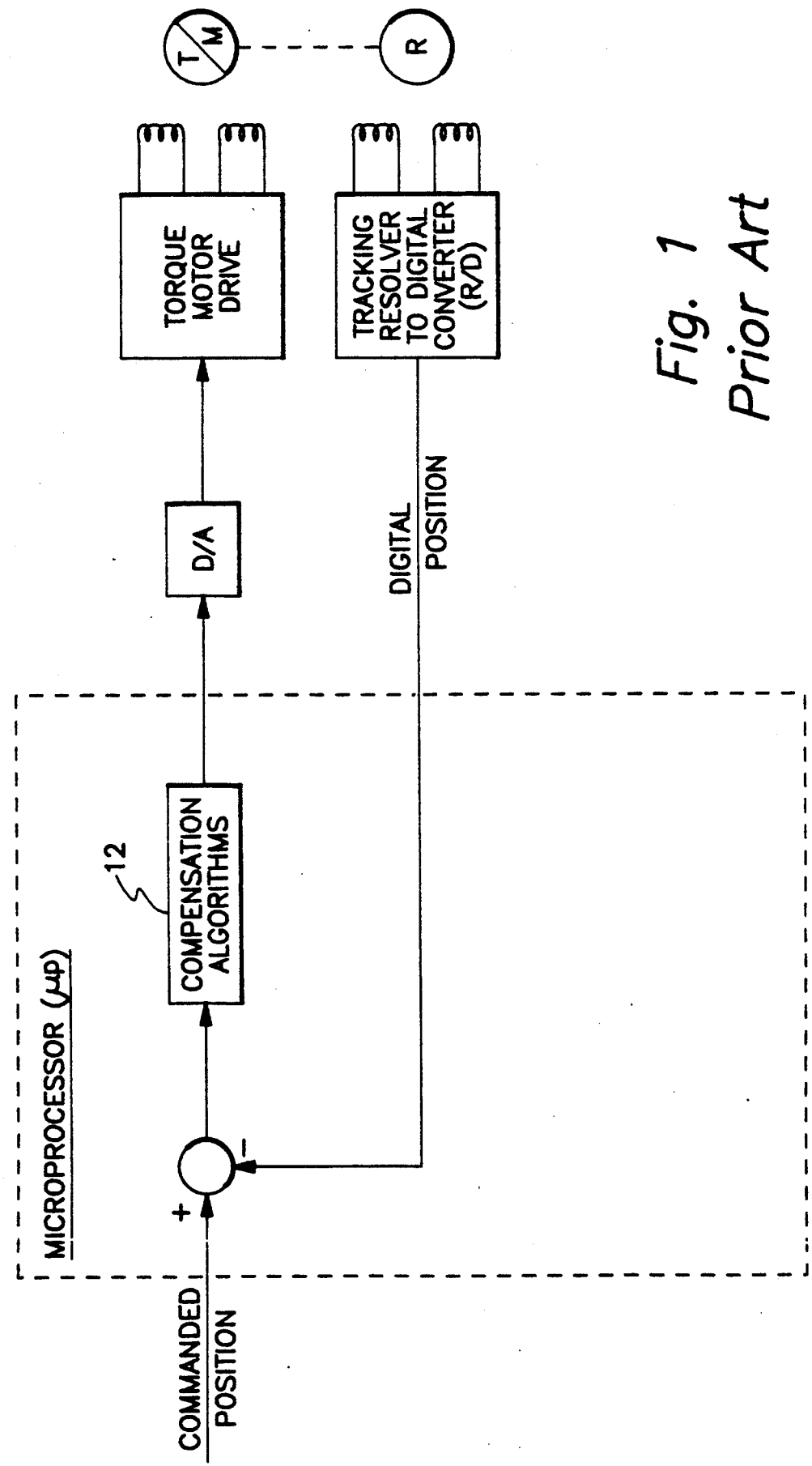
FIG. 1 shows a block diagram of a microprocessor-controlled positioning system, utilizing a tracking resolver-to-digital converter feedback element, of the prior art.

Referring to FIG. 1, there is shown a block diagram of a prior art implementation of a microprocessor-controlled positioning system utilizing a tracking resolver-to-digital converter as a feedback element, and is commonly used in robotic and gimballed positioning systems, such as antenna pointing systems (in which case the antenna is the device to be pointed). As is well understood by those skilled in the art, the system of FIG. 1 can exhibit a serious disadvantage; namely, a quantization limit cycle resulting from the quantized nature of the digital position feedback signal. The limit cycle occurs when the open loop transfer function phase crosses 180 degrees on the Bode diagram. The magnitude of the resulting limit cycle is dependent upon the incremental steps of the quantization and the gain of the position loop. These limit cycles produce undesirable pointing jitter and also results in unwanted reaction torques in the system.

Figure 2:
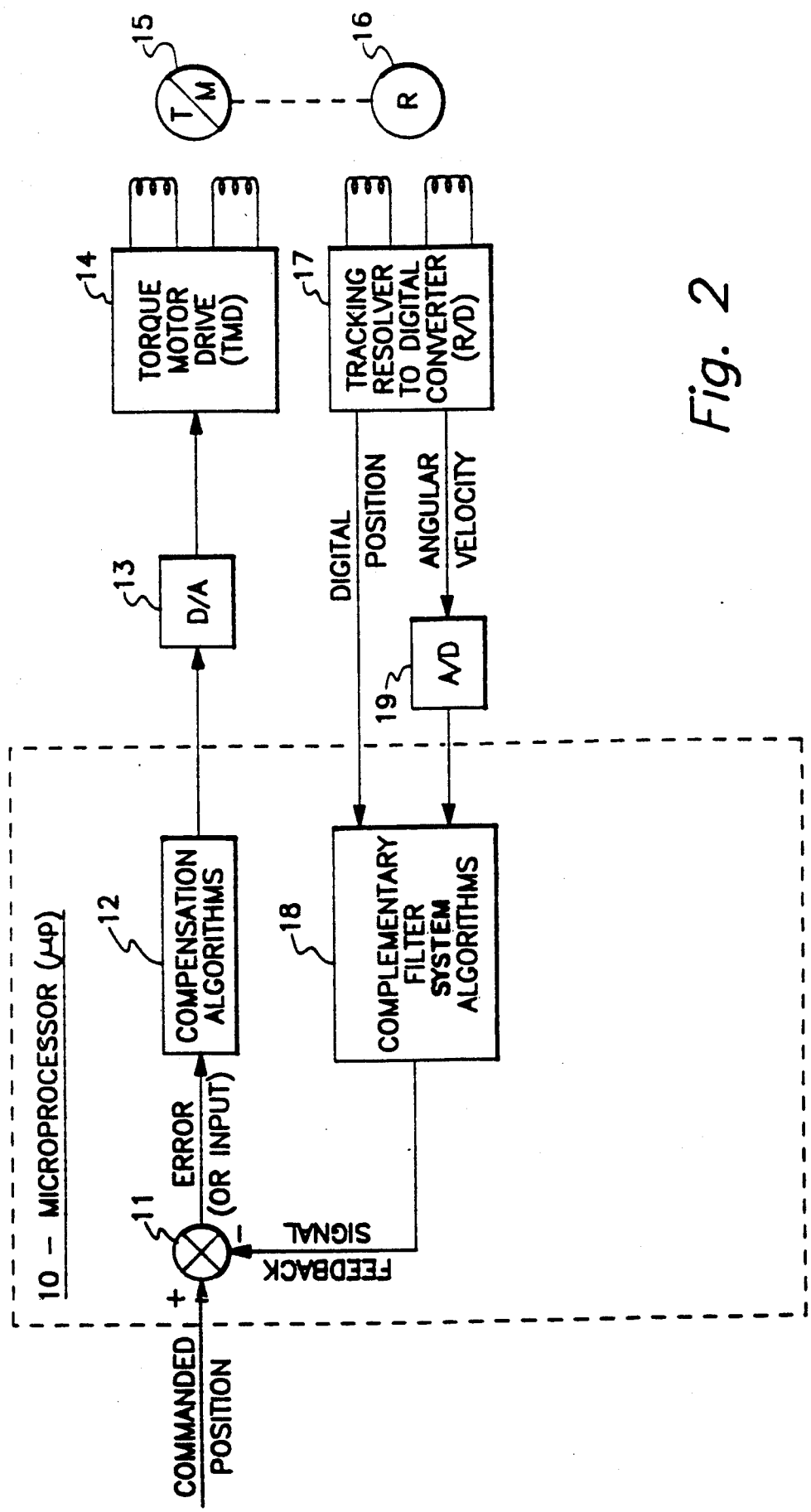
FIG. 2 shows a block diagram of a digital positioning system of the preferred embodiment of the present invention.

Referring to FIG. 2 there is shown a block diagram of a digital positioning loop system of the present invention. The positioning system of the preferred embodiment of the present invention includes a difference device 11 which receives a COMMAND POSITION input signal from some other system or device (such as a processor which has determined a location of a star which is to be sighted). The output of the difference device 11 is an ERROR (sometimes referred to herein as INPUT) signal, which is the difference between the COMMANDED POSITION and a FEEDBACK signal. The INPUT signal is inputted to an element which performs a compensation function on the INPUT signal. In the preferred embodiment of the present invention, the compensation function is performed within a microprocessor ($\mu$p) 10, the compensation function thereby being performed by a compensation algorithm 12 within the microprocessor 12, analogous to that of the prior art systems of FIG. 1. The compensation 12 utilized in the preferred embodiment of the present invention is expressed by the following:

$$\text{Compensation} = \frac{K_e(4s/\omega_{co} + 1)^2}{s(s/4\omega_{co} + 1)} \text{ (s domain)}$$

Any conventional transformation can be utilized (e.g., Euler, Tustin, ... To obtain the discrete equivalent to this transfer function, the method of the preferred embodiment of the present invention, pole-zero mapping is used. (See, for example, Digital Control of Dynamic Systems by Franklin and Powel, Addison-Wesley 1980, ISBN 0-201-02891-3 pages 61 and 62). Using this method, the Z-domain equivalent transfer function is:

$$\text{Compensation} = \frac{K_e K_z (z - e^{-t\omega_{co}/N})^2}{(z - 1)(z - e^{-tN\omega_{co}})} \text{ (z domain)}$$

Note that the compensation contains a free integrator to insure that the steady state position error to the loop is driven to zero. With this type of compensation, the limit cycle problem occurs. The output of the compensation algorithm 12 of the microprocessor 10 is a digital output signal coupled to a digital to analog (D/A) converter 13, the output of the D/A converter 13 in turn being coupled to a torque motor drive (TMD) 14 for positioning a torque motor (T/M) 15. A resolver (R) 16, coupled to the torque motor 15 generates a resolver output signal. The resolver output signal is coupled to a tracking resolver-to-digital (R/D) converter 17, and indicates the position of the torque motor 15. The resolver-to-digital converter 17 (R/D), a standard item well understood by those skilled in the art and readily available in the marketplace, includes two output signals, a DIGITAL POSITION and an analog ANGULAR VELOCITY signal. The DIGITAL POSITION signal and the analog ANGULAR VELOCITY signal are both coupled to complementary filters 21 and 22, respectively, the ANGULAR VELOCITY signal first being converted to a digital signal by an analog to digital converter (A/D) 19. Traditionally, complementary filters are defined to be filters for which the sum of their transfer functions is unity over the frequency range of interest. (See, for example, U.S. Pat. No. 4,667,090, Carrerras et al). Complementary filters can be used to combine the outputs from two sensors so as to provide a single measurement having a higher bandwidth and accuracy than could be obtained from either sensor by itself. For example, if one sensor provides an accurate long term (low frequency) position measurement and a second sensor provides good short term (high frequency) position, the complementary filters would consist of a low pass filter for the first sensor and a high pass filter for the second. In the present invention, the second signal is the derivative of the first, so the complementary filters are both low pass filters. (A rate signal passed through a low pass lag produces position at high frequency). The network of two such complementary filters and the summer is referred to as a "complementary filter system". In the preferred embodiment of the present invention the complementary filter system 18 is implemented by algorithms (complementary filter system algorithms 18) in microprocessor 10. The output of the complementary filter system 18, the FEEDBACK signal, is coupled to the difference device 11.

Figure 3:
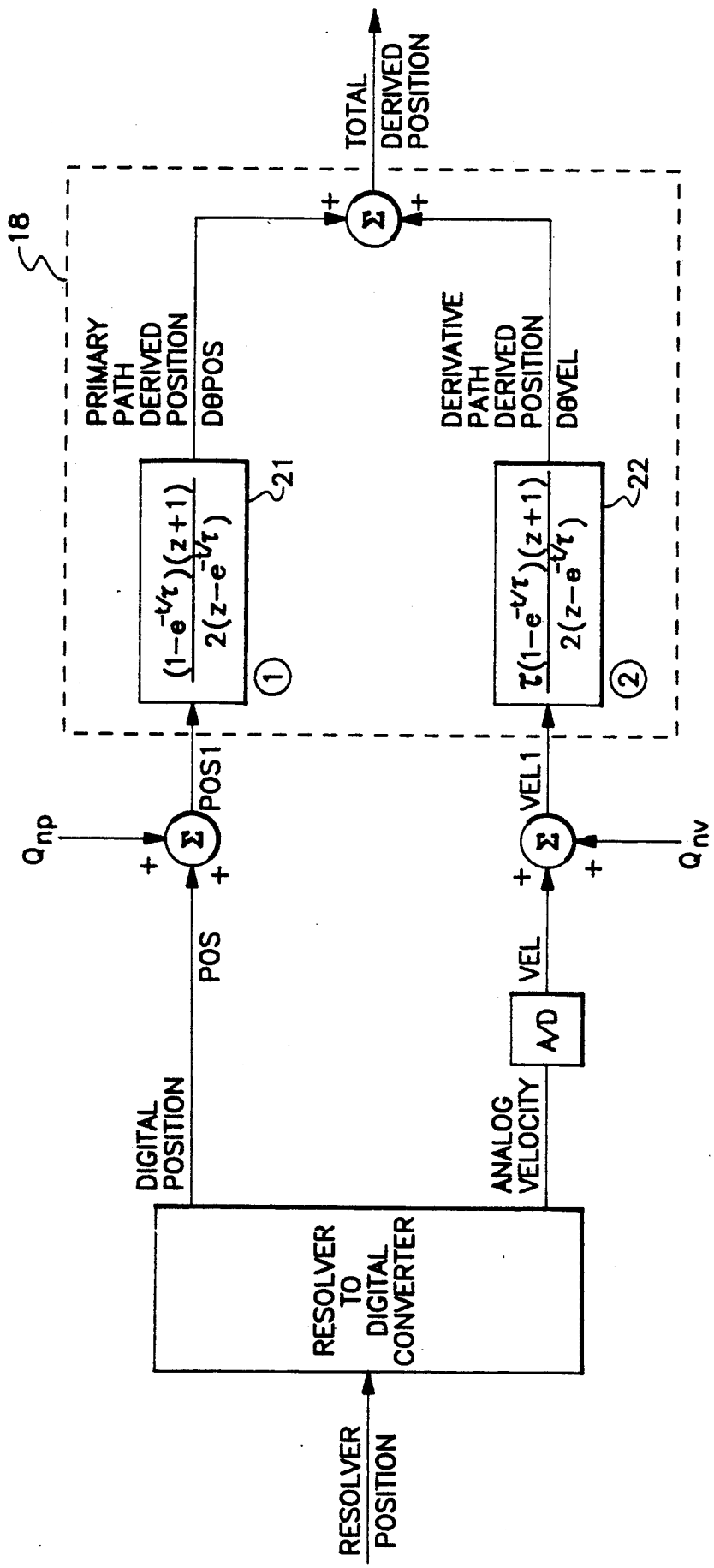
FIG. 3 shows a model diagram of the complementary filter system of the preferred embodiment of the present invention.

Having thus described a digital position loop of the present invention, the complementary filter system will now be discussed. Referring to FIG. 3, there is shown a mathematical model diagram of the complementary filter system 18 of the preferred embodiment of the present invention. The position signal, POS, and the velocity signal, VEL, are assumed to be ideal and denote the actual position and velocity of the measured device under control. The inputs $Q_{nv}$ and $Q_{np}$ denote equivalent noise inputs due to the various system components, such as sensors. Thus the inputs POS1 and VEL1 to the complementary filter system 18 of FIG. 3 corresponds to the DIGITAL POSITION signal and ANGULAR VELOCITY signal, respectively, inputted to the complementary filter system algorithm 18 of FIG. 2. The filter characteristics of the primary path and the filter characteristics for the derivative path, are shown 21, 22, respectively. (Note that the primary path is sometimes referred to herein as the position path, and the derivative path is sometimes referred to herein as the velocity path.) The outputs of the position path complementary filter 21 and the derivative complementary path filter 22 complementary are denoted as the derived position (D$\theta$POS) from the position path and derived position from the velocity path (D$\theta$VEL), respectively. The combined result of these outputs is denoted as the total derived position, which corresponds to the FEEDBACK signal. The combined transfer function of the primary (i.e., the position path) and the derivative path from actual position POS to the totally derived position is shown in equation 1. The transfer function of the complementary filter has a unity gain independent of the parameter TAU ($\tau$), thus the totally derived position equals the actual position POS. It will be noted from cases where TAU=0, the complementary system filter essentially system does not exist and the loop is closed through the quantized position path, that is through the block 21, the block 22 being equal to zero.

$$\frac{\theta'_v + \theta'_p}{\theta} = \frac{\theta'}{\theta} = \frac{s\tau + 1}{s\tau + 1} = 1 \text{ (s domain)} \quad (1)$$

$$= \frac{z - e^{-t/\tau}}{z - e^{-t/\tau}} \text{ (z domain)}$$

where:
$\theta$ = actual position, POS
$\theta'_p$ = derived position, D$\theta$POS
$\theta'_v$ = derived position from velocity, D$\theta$VEL Equations 2 and 3 show the transfer function characteristics of the derived position to actual position of the primary and derivative paths in both the s and z domain, respectively, with the equivalent noise inputs $Q_{np}$ and $Q_{nv}$ equal to zero.

$$\left.\frac{\theta'_p}{\theta}\right|_{Q_{np}=0} = \frac{1}{s\tau + 1} \text{ (s domain)} \quad (2)$$

$$= \frac{(1 - e^{-t/\tau})(z + 1)}{2(z - e^{-t/\tau})} \text{ (z domain)}$$

$$\left.\frac{\theta'_v}{\theta}\right|_{Q_{nv}=0} = \frac{s\tau}{s\tau + 1} \text{ (s domain)} \quad (3)$$

$$= \frac{(1 + e^{-t/\tau})(z - 1)}{2(z - e^{-t/\tau})} \text{ (z domain)}$$

Equations 4 and 5 show the transfer function of the equivalent noise inputs to the derived positions in the primary and derivative paths in both the s and z domain, respectively.

$$\frac{\theta'_p}{Q_{np}} = \frac{1}{s\tau + 1} \text{ (s domain)} \quad (4)$$

$$= \frac{(1 - e^{-t/\tau})(z + 1)}{2(z - e^{-t/\tau})} \text{ (z domain)}$$

$$\frac{\theta'_v}{Q_{nv}} = \frac{\tau}{s\tau + 1} \text{ (s domain)} \quad (5)$$

$$= \frac{\tau(1 - e^{-t/\tau})(z + 1)}{2(z - e^{-t/\tau})} \text{ (z domain)}$$

The effect of increasing $\tau$ is to lower the break frequency of the position path lag which attenuates the high frequency response of the position path of the complementary filter because the high frequency components of the position path are the source of the torque spike which occurs. The effect of increasing $\tau$ in the derivative path of the complementary filter, however, is to attenuate the low frequency components and allow the high frequency components to pass through. The initial transient response is therefore provided by the velocity path of the complementary filter system. Quantization effects in the velocity path are attenuated by the lag of the complementary filter. As time increases, the velocity path contribution decays to zero and the position path increases to provide the steady state response. Thus, $\tau$ should be as large as possible within some predetermined bounds. First, as $\tau$ approaches infinity, the position path becomes open loop and since the derivative path is undefined at zero frequency, the total derived position, to actual position can be undefined; and second, any noise contributed by the sensor to the velocity sensor will be multiplied by the gain $\tau$ resulting in more and more corruption as $\tau$ is increased. The actual upper limit on $\tau$ is therefore a function of the actual digital system (sensors, loop characteristics and system performance parameters) in which the complementary filter system is used. However, to realize the attenuation effects in the primary path of the complementary filter system, the value of $\tau$ must be greater than the inverse of the loop bandwidth:

$$\tau > \frac{1}{\text{BANDWIDTH}}$$

Although the complementary filter system 18 of the preferred embodiment of the present invention was implemented in software using standard numerical analysis techniques, it will be understood by those skilled in the art that the complementary filter system 18 can also be readily implemented in hardware.

Figure 4:
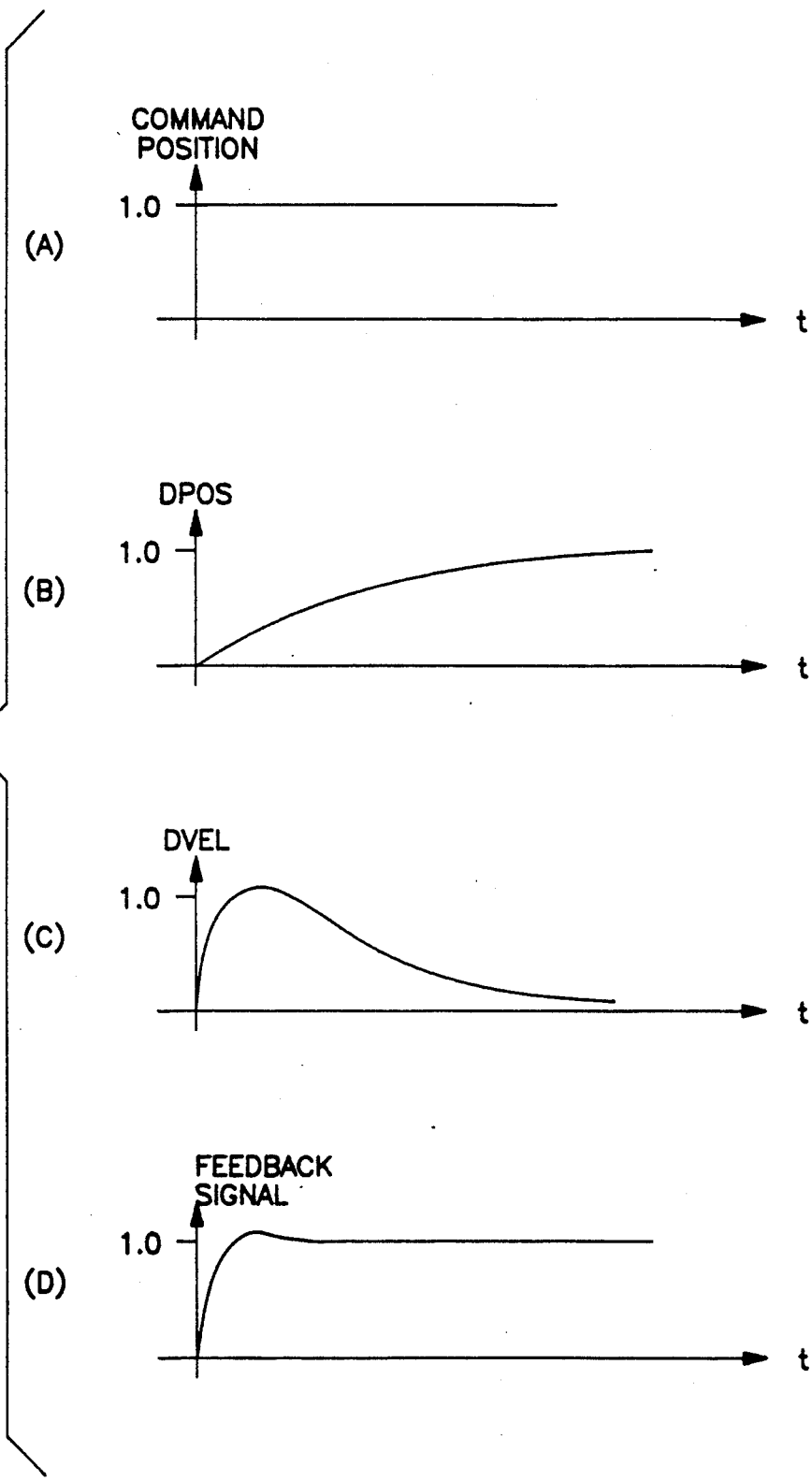
FIG. 4 shows a typical time plot of various signals of the positioning system of the preferred embodiment of the present invention.

Referring to FIG. 4, FIG. 4A through 4D which together comprise FIG. 4, there is shown a time plot of the signals of interest of the positioning system of FIG. 2. Assume, for example purposes only, that the COMMANDED POSITION signal has a value of 1.0 (FIG. 4A). The derived position signal from the position path (D$\theta$POS) will rise slowly to a steady state value of 1.0 (FIG. 4B). FIG. 4C shows the derived position signal from the velocity path (D$\theta$VEL) which responds quickly with some overshoot and then decays to zero, and lastly, FIG. 4D shows the FEEDBACK signal, such that the INPUT signal to the compensation algorithm 12, sometimes referred to in the art as the error signal, is zero.

Thus, from the time domain point of view, the two paths (i.e., primary and derivative feedback paths) add together to produce a much smoother feedback than the unfiltered position path alone can do. In response to the step command, the primary path responds much slower to the output of the resolver to digital converter 17 than the derivative path. The derivative path, however, has a very fast response time and provides the initial transient portion of the total derived feedback. As the output of the derivative path is decaying to zero the primary path contribution is increasing. When the primary path reaches the steady state position commanded, the derivative path contribution is zero, thereby minimizing the quantization limit cycle effects. Thus is can be seen how the complementary filter 18 is used with digital feedback elements to minimize unwanted effects resulting form the quantization processes. It will be understood by those skilled in the art that the present invention is not limited to a positioning system, but is applicable to any quantized signal in which the derivative of the signal is also available, or readily derivable.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. An apparatus for controlling the positioning of a device in response to a commanded input signal, said apparatus comprising:
   (a) means for moving the device in response to an error signal;
   (b) sensor means for determining the actual position of the device, said sensor means outputting a quantized primary signal and a derivative signal corresponding to the actual position and velocity of the device, respectively; and
   (c) complementary filter system means, for filtering the primary signal and the derivative signal to generate a derived position signal, the derived position signal being combined with the commanded input signal to generate the error signal, whereby the filtering results in effectively increasing the resolution of the sensor means thereby reducing the limit cycle caused by quantization of the sensor means.

2. An apparatus for controlling the positioning of a device according to claim 1, wherein said complementary filter system means comprises:
(a) first filter means for filtering said primary signal;
(b) second filter means for filtering said derivative signal, wherein said first filter means is the complement of the second filter means, and the second filter means is the complement of the first filter means; and
(c) means for combining the output signal of said first and second filter means to generate the derived position signal.

3. An apparatus for controlling the positioning of a devise according to claim 2, wherein said complementary filter system means has a unity gain transfer function over a predetermined frequency range of interest.

4. An apparatus for controlling the positioning of a device according to claim 3, wherein said apparatus further comprises: compensation means, interposed in the apparatus before the means for moving and in a position to receive the error signal, for causing the steady state position error of the apparatus to be driven to zero.

5. An apparatus for controlling the positioning of a device according to claim 4, wherein said means for moving comprises:
(a) torque motor drive; and
(b) torque motor operatively connected to the device to be positioned.

6. An apparatus for controlling the positioning of a device according to claim 1, wherein said apparatus further comprises:
compensation means, interposed in the apparatus before the means for moving and in a position to receive the error signal, for causing the steady state position error of the apparatus to be driven to zero.

7. An apparatus for controlling the positioning of a device in response to a commanded input signal, said apparatus comprising:
(a) means for moving the device in response to an error signal;
(b) sensor means for determining the actual position of the device, said sensor means outputting an analog position signal corresponding to the actual position of the device;
(c) a differentiator means, operatively connected to said sensor means, for generating an analog velocity signal;
(d) converter means, operatively connected to said sensor means and to said differentiator means, for converting said analog position signal to a digital position signal and said analog velocity signal to a digital velocity signal; and
(e) complementary filter system means, operatively connected to said converter means to receive said digital position signal and said digital velocity signal, for filtering said digital position signal and said digital velocity signal to generate a derived position signal, the derived position signal being combined with the commanded input signal to generate the error signal, whereby the filtering results in effectively increasing the resolution of the sensor means thereby reducing the limit cycle caused by quantization of the sensor means.

8. An apparatus for controlling the positioning of a device according to claim 7, wherein said complementary filter system means comprises:
(a) first filter means for filtering said digital position signal, generating a first output signal;
(b) second filter means for filtering said digital velocity signal, generating a second output signal, wherein said first and second filter means are the complement of the other; and
(c) means for combining the first and second output signals of said first and second filter means to generate the derived position signal.

9. An apparatus for controlling the positioning of a device according to claim 8, wherein said complementary filter means has a unity gain transfer function.

10. An apparatus for controlling the positioning of a device according to claim 9, wherein said apparatus further comprises:
compensation means, interposed in the apparatus before the means for moving and in a position to receive the error signal, for causing the steady state position error of the apparatus to be driven to zero.

11. An apparatus for controlling the positioning of a device according to Claim 10, wherein said means for moving comprises:
(a) torque motor drive; and
(b) torque motor operatively connected to the device to be positioned.

12. An apparatus for controlling the positioning of a device according to claim 7, wherein said apparatus further comprises:
compensation means, interposed in the apparatus before the means for moving and in a position to receive the error signal, for causing the steady state position error of the apparatus to be driven to zero.

* * * * *